Oct. 13, 1942.  F. E. WOLCOTT  2,298,854
BEVERAGE BREWING DEVICE
Filed Feb. 18, 1939
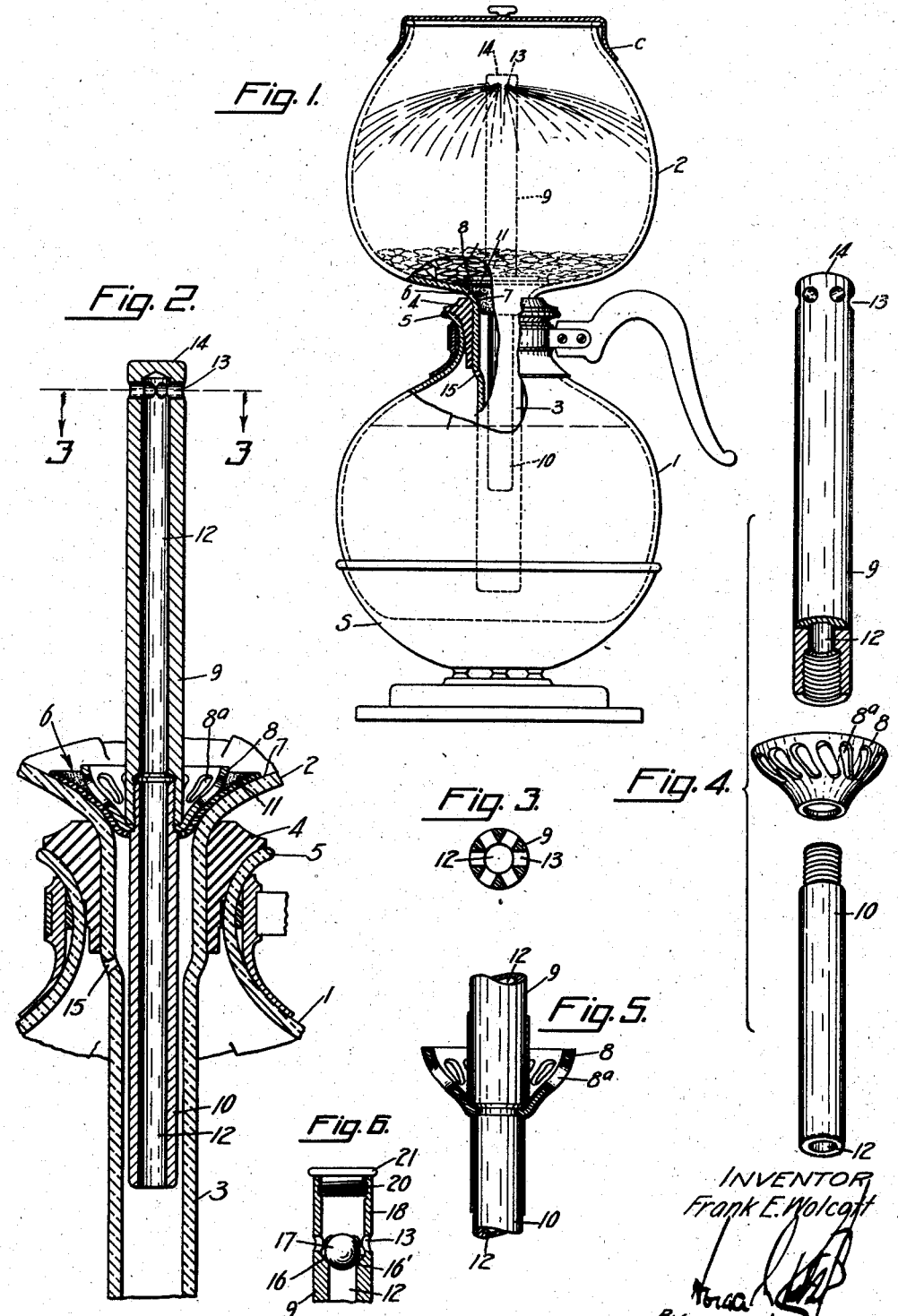
INVENTOR
Frank E. Wolcott
By
ATTORNEY Patented Oct. 13, 1942

2,298,854

UNITED STATES PATENT OFFICE 2,298,854

BEVERAGE BREWING DEVICE

Frank E. Wolcott, West Hartford, Conn., assignor to The Silex Company, a corporation of Connecticut Application February 18, 1939, Serial No. 257,215

3 Claims. (Cl. 53—3)

My invention relates to beverage brewing devices.

It has among its objects to provide an improved brewing device for beverages wherein hot water is poured over the beverage material in an improved manner, and, more particularly, such an improved device which is especially adapted to use in brewing tea, but also adapted to use with coffee. A further object of my invention is to provide such a device of an improved construction and having improved flow controlling means adapted automatically upon heating and cooling the lower or water bowl to control the flow between the water bowl and an upper beverage material containing or infusion bowl and to provide a quick free flow of very hot water on top of the beverage material in the upper bowl for infusion therein and, after an infusion of the desired length, effect an automatic and quick return of the liquid beverage to the water bowl for dispensing from the latter. A still further object of my invention is to provide such an improved construction adapted to utilize certain of the elements of a standard vacuum type coffee maker, while requiring only special construction of the strainer element thereof and a minor change in the stem of the upper bowl, and having improved means for effecting and controlling the flow between the bowls. Still further objects of my invention are to provide an improved combined spraying and straining unit, improved means for by-passing the straining means and delivering the hot water into the upper bowl at a point above the beverage material, and also improved means for controlling the action of the flow up through this unit and improved cooperating means for effecting the desired automatic and quick return of the brew through the strainer mechanism as a result of the vacuum created in the lower bowl as the latter cools. Other objects and advantages of my improved construction will, however, hereinafter more fully appear.

In the accompanying drawing I have shown for purposes of illustration one embodiment which my invention may assume in practice.

In the drawing:

Figure 1 is a side elevation of a complete brewing device of my improved form seated on an electric stove, certain parts being broken away to facilitate illustration;

Fig. 2 is an enlarged detail view of one form of my improved combined spraying and draining unit and the adjacent parts of the device;

Fig. 3 is a section on line 3—3 of Figure 2;

Fig. 4 is a perspective view of this spraying and strainer unit with the parts in separated relation one above the other;

Fig. 5 is a detail view showing the covering of the parts with enamel, and

Fig. 6 is a detail sectional view of a modified construction including a valve on the upper end of the unit.

In this illustrative construction, I have shown a brewing device seated on a suitable electric stove S and including a lower bowl 1 and an upper bowl 2 having a stem 3 extending through a suitable seal 4 into the neck 5 of the lower bowl, while a straining mechanism, generally indicated at 6, is seated in the mouth 7 of the stem 3; improved hot water spraying means and spray controlling means hereinafter described herein being associated with the strainer mechanism and the stem 3.

Referring more particularly to the straining mechanism, it will be noted that the same is generally of the unit type described in my copending application Serial No. 238,207, filed Nov. 1, 1938, including a cup basket 8 having radial inclined slots or openings 8a and carried on and clamped between cooperating weighted rod sections 9 and 10 threaded together and coaxial with the basket and cooperating therewith to press the latter against a strainer disc 11 disposed over the mouth 7 of the stem 3. Herein, however, it will be observed that this unit carries improved means for effecting an improved flow relative to the strainer mechanism whereby an improved upward hot water flow is delivered into the upper bowl above the beverage material therein.

Referring more particularly to my improved construction, it will be observed that the members 9 and 10 are provided with an axial hot water passage 12 extending from the bottom of the rod section 10 substantially to the top of the rod section 9. Further, this passage 12 communicates with the interior of the upper bowl 2 near the top of rod section 9 by means of any suitable number of radially located ports or openings 13, herein six, disposed beneath a closed top 14 on the rod section 9. As a result of this construction, it will be observed that a passage of considerable capacity is provided up through the strainer disc 11 through which the liquid may pass without moving through the strainer disc 11. Further, it will be observed that due to the provision of the ports 13, this liquid will be distributed from the top of the rod section 9 in the form of jets spraying over the top of the brewing material which is disposed in the bowl 2 over the filter cup 8 and filter disc 11.

Cooperating with this structure is also improved means adapted to control and time the flow of the hot water through the passage 12. Herein, this means assumes the form of a suitable small opening 15, herein a so-called pinhole, in the stem 3. As shown, this opening 15 is located at a point just below the bottom of the seal 4 and above the initial water level in the bowl 1. By reason of the provision of this opening 15, it is made possible for the steam and pressure initially developed in the bowl 1 above the liquid therein, to escape from the bowl 1 as the latter is heated, and to pass up through the strainer disc 11, until a predetermined limit is reached, whereupon, the opening 15 being unable longer to carry off the steam, the then boiling water passes up through the passage 12 and is delivered radially through the ports 13 on to the top of the beverage material in the upper bowl.

In the operation of my improved construction, as in a usual vacuum type coffee maker, the beverage material is placed in the upper bowl 2 above the strainer member 8 and the water in the lower bowl 1, the combined spraying and straining unit then being disposed in the position shown in Figure 1. When the lower bowl 1 is heated by the stove S, the initial steam and pressure in the latter bowl is allowed to escape as heretofore described through the opening 15. When, however, the pressure above the water in the bowl 1 builds up to a predetermined extent, i. e. when the water therein is actually boiling and very hot, this water surges upward through the closed pipe provided by the passage 12, rather than through the strainer disc 11, in such manner as to produce a spray of this very hot liquid through the ports 13 in upper rod section 9 over the brewing material in the bottom of the bowl 2. In practice, the opening 15 and the passages 12 and 13 are so related that for a substantial time during the heating of the lower bowl 1, there is no liquid flow upward through the strainer 11. However, as pressure builds up sufficiently to cause the water just to begin to appear in the bottom of the strainer cup 8, a sudden fast flow of very hot water emerges from the apertures or ports 13 and flow through the strainer stops. This flow through the port 13 continues until no more water can pass up from the bowl 1 to the bowl 2. Thereupon, the bowl 1 is permitted to cool in a usual manner, as, for example, by turning off the current or removing the same from the stove S. Then, the brewed beverage in the bowl 2, after a normal infusion period, is returned automatically and quickly to the lower bowl 1 as a result of the vacuum condition therein, and, after removal of the upper bowl 2 with the combined spraying and straining unit therein, dispensed from the bowl 1 in a usual manner.

In Figure 6 I have shown a modified structure including an automatically acting valve disposed above the ports 13 and carried on the combined straining and spraying unit. In this construction, it will be observed that a ball valve seat 16 having an opening 16' therein, is provided in the passage 12 through the upper rod section 9 at a point just below the ports 13. Further, a suitable ball 17, preferably formed of light material such as glass or porcelain, normally rests on this seat and closes communication between the interior of the lower bowl 1 and the atmosphere. It will also be noted that there is an extension 18 on the section 9 above the ports 13, and that a suitable removable closure 19 is suitably threaded, as at 20, in the upper end of this extension, this closure preferably having a flange 21 to facilitate turning the same. In this construction, it will be evident that the valve opening 16' will be closed until sufficient pressure has been built up in the stem to lift the ball 17, and that the ball will then suddenly be lifted up and ride upon the upwardly flowing jet of liquid which passes through the valve seat and flowing out in separate streams through the ports 13. Further, it will be apparent that when this flow ceases, the ball 17 will automatically resume its normal position on the seat 16 closing the opening 16' therein, thereby preventing the entry of air into the lower bowl 1. As a result of this construction, any tendency for cool air to pass down through the tube while the lower bowl 1 is cooling, with resultant disturbance of the vacuum in that bowl in such manner as to prevent the return of all of the brewed liquid to that bowl, is overcome irrespective of whether the cover C is on or off of the upper bowl. Obviously, through variations in the weight of the ball, the time of operation of the jet may be varied, as desired.

As a result of my improved construction, it is made possible to obtain the effect of pouring very hot water over the brewing material which is particularly desired in brewing tea. Also, it is made possible to obtain a new and desirable sudden pouring action and an improved timing of the infusion. More particularly, through my improved timing and control of this spray, it is made possible to eliminate the gradual surging up of the liquid through the strainer and thereby very closely to reproduce the effect of suddenly pouring very hot water from a kettle upon the brewing material which herein is disposed above the strainer. At the same time that these advantages are obtained, it is also made possible to continue to obtain the automatic return of the brewed beverage after a normal infusion without requiring the provision of any additional structure in the upper bowl other than that carried by the strainer unit, and further to eliminate all necessity for any manual operation in order to effect the return of the brewed beverage after infusion in the upper bowl. Attention is further directed to the fact that with my improved construction, it is possible to utilize various parts of a standard vacuum type coffee maker, with only inexpensive changes in the weighted strainer carrying rod thereof, and in the stem of the upper bowl, all in such manner as to enable my improved construction to be produced very inexpensively. Obviously, the entire combined strainer and spraying unit can also still be enameled if desired, as shown in Figure 5, and the parts of this unit can also be made of various materials other than the metal illustrated, if desired, while being suitably weighted to obtain the effect of metal. These and other advantages of my improvements will, however, be clearly apparent to those skilled in the art.

While I have in this application specifically described two embodiments which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. For a beverage brewer of the character described, a device comprising a hollow rod including an upper section having a closed end and orifices adjacent said end extending laterally from the interior thereof, a lower section, and a cup-shaped spirally slotted member secured between said upper and lower sections.

2. For a beverage brewer of the character described, a device comprising a hollow rod including an upper section having a closed end and apertures radiating from the interior thereof near said end, a lower section threaded to said upper section, and a cup-shaped slotted member secured between parallel abutting surfaces on said upper and lower sections.

3. For a beverage brewer of the character described, a device comprising a tubular bar including an upper and a lower section, the upper section being closed at one end thereof and having orifices radiating from its interior, the lower section being threaded to said upper section and having a shoulder spaced from the bottom of said upper section, and a cup-shaped member secured between said shoulder and bottom.

FRANK E. WOLCOTT.